US00RE37869E

(19) United States
(12) Reissued Patent
Suzuki

(10) Patent Number: US RE37,869 E
(45) Date of Reissued Patent: Oct. 8, 2002

(54) HEAD SIGNAL SUPPLY/RETRIEVAL STRUCTURE FOR MAGNETIC DISC DRIVE

(75) Inventor: Kazuhiro Suzuki, Kawasaki (JP)

(73) Assignee: Fujitsu Limited, Kawasaki (JP)

(21) Appl. No.: 09/244,142

(22) Filed: Feb. 2, 1999

Related U.S. Patent Documents

Reissue of:
(64) Patent No.: 5,644,448
Issued: Jul. 1, 1997
Appl. No.: 08/539,340
Filed: Oct. 5, 1995

(30) Foreign Application Priority Data

Mar. 17, 1995 (JP) ..... 7-059538

(51) Int. Cl.[7] ..... G11B 5/012
(52) U.S. Cl. ..... 360/97.01; 360/245.8; 360/264.2; 360/266.3; 360/245.9
(58) Field of Search ..... 360/97.01, 104–106, 360/245.8, 245.9, 264.2, 266.3

(56) References Cited

U.S. PATENT DOCUMENTS

| | | | | |
|---|---|---|---|---|
| 5,055,969 | A | 10/1991 | Putnam | 361/398 |
| 5,095,396 | A | 3/1992 | Putnam et al. | 360/106 |
| 5,103,359 | A | 4/1992 | Marazzo | 360/104 |
| 5,161,074 | A | 11/1992 | Forbord et al. | 360/97.01 |
| 5,161,077 | A | 11/1992 | Jabbari | 360/106 |
| 5,325,252 | A | 6/1994 | Yagi et al. | 360/106 |
| 5,391,842 | A | 2/1995 | Bennin et al. | 174/260 |
| 5,418,666 | A | 5/1995 | Mihara et al. | 360/97.01 |
| 5,422,764 | A | 6/1995 | McIlvanie | 360/97.01 |
| 5,491,597 | A | 2/1996 | Bennin et al. | 360/104 |
| 5,612,840 | A | 3/1997 | Hiraoka et al. | 360/104 |
| 5,708,541 | A * | 1/1998 | Erpelding | 360/104 |

FOREIGN PATENT DOCUMENTS

| | | |
|---|---|---|
| JP | 4-69803 | 3/1992 |
| JP | 4-358388 | 12/1992 |
| JP | 5-135308 | 6/1993 |
| JP | 5-266451 | 10/1993 |
| JP | 06-243449 | 9/1994 |
| JP | 6-267048 | 9/1994 |

* cited by examiner

*Primary Examiner*—A. J. Heinz
(74) *Attorney, Agent, or Firm*—Greer, Burns & Crain, Ltd.

(57) ABSTRACT

A disk drive having a connection structure between a head and a main flexible printed circuit sheet, allowing a signal to be supplied to and taken out of a head in response to size reduction and thickness reduction of the disk drive. The disk drive includes an actuator arm rotatably mounted in a housing, and a suspension having a base end portion fixed to a front end portion of the actuator arm and a front end portion for supporting the head. The main flexible printed circuit sheet is fixed at its one end portion to the actuator arm. An interconnection flexible printed circuit sheet is mounted along one side surface of the actuator arm so as to extend substantially parallel to the upper surface of the actuator arm, and connects terminals of the suspension and terminals of the main flexible printed circuit sheet.

38 Claims, 9 Drawing Sheets

HEAD SIGNAL SUPPLY/RETRIEVAL STRUCTURE FOR MAGNETIC DISC DRIVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a magnetic disk drive, and more particularly to a connection structure for supplying a write signal to a magnetic head or retrieving a signal read by the magnetic head from the magnetic disk drive to external equipment.

2. Description of the Related Art

In recent years, size reduction and thickness reduction have been advanced in a magnetic disk drive as a kind of external storage for a computer. Further, low power consumption in such a magnetic disk drive is also desired. In addition, an improvement in recording density of a magnetic disk is also demanded to obtain a large storage capacity, and the number of disks to be mounted in the disk drive is accordingly increasing.

In a magnetic disk drive for a computer, a contact start and stop (CSS) system defining the [relation] *relationship* between a head and a disk is generally adopted. In this system, while the disk is being rotated at a high speed, a head flying force generated by an air flow due to high-speed rotation of the disk balances a pressing force of a suspension pressing the head on the disk, so that the head is kept at a microscopic flying height from the disk. When the rotation of the disk is stopped, the head is moved to a landing zone on the disk and comes [to] *into* contact with the disk at this zone. In the rest condition of the disk, the head and the disk remain in contact with each other.

Conventionally, lead wires mounted on the suspension are used to supply a write signal to the head or take a signal read by the head out of the magnetic disk drive. However, as downsizing of the magnetic disk drive proceeds, the structure of the suspension to be adopted is being shifted from the above type [that] *in which* the lead wires are mounted *upon the suspension* to another type [that] *in which* a conductor pattern connected to the head is formed integrally on the surface of the suspension.

In a conventional magnetic disk drive adopting such a suspension with a conductor pattern, there is provided inside the magnetic disk drive a main flexible printed circuit sheet (which will be hereinafter referred to as a main FPC) for leading wiring to a printed circuit board provided outside the magnetic disk drive. Terminals provided at a base end portion of the suspension are connected through lead wires to terminals of the main FPC. The main FPC is fixed at its one end portion to an actuator arm by bonding or screwing. Accordingly, the lead wires are installed along a side surface of the actuator arm.

A magnetoresistive head (MR head) has been developed as a head in a recent magnetic disk drive. The MR head has an inductive element to be used [in] *for* writing data and a magnetoresistive element (MR element) to be used [in] *for* reading data. Accordingly, the number of signal lines is four [in] *when* using the MR head as compared with a conventional general head requiring two signal lines. Such an increase in *the* number of signal lines causes an increase in *the* number of wiring steps *where the number of steps is* double that in the general head in connecting the terminals of the suspension through the lead wires to the terminals of the main FPC.

Further, since the number of the terminals is also increased, a double space for installing the terminals of the suspension and the terminals of the main FPC becomes necessary. However, in the recent magnetic disk drive designed to reduce its size and thickness, sufficient space for installation of the terminals is difficult to ensure. That is, the terminal installation space is small and the distance between the adjacent terminals must be reduced.

For these reasons, it is undesirable to use [the] lead wires for the connection between the terminals of the suspension and the terminals of the main FPC. In this respect, there has been proposed a technique of connecting the terminals of the suspension and the terminals of the main FPC by using an interconnection flexible printed circuit sheet (which will be hereinafter referred to as an interconnection FPC). In this prior art, the interconnection FPC is attached to the side surface of the actuator arm to connect a conductor pattern formed on the suspension and a conductor pattern formed on the main FPC.

The advance of size reduction and thickness reduction of the recent magnetic disk drive as described above causes a reduction in thickness of the actuator arm. Further, the use of the MR head causes an increase in number of signal lines to be enclosed in the interconnection FPC. Accordingly, in the above prior art method where the interconnection FPC is attached to the side surface of the actuator arm, the width of the interconnection FPC is decreased with a decrease in thickness of the actuator arm to cause a problem such that it is difficult to ensure a necessary number of signal lines in the interconnection FPC and the pattern width of each signal line is reduced.

SUMMARY OF THE INVENTION

It is therefore an object of the present invention to provide a disk drive having a connection structure between a head and a main FPC which can supply a write signal to the head and take out a read signal from the head with high reliability in response to size reduction and thickness reduction of the disk drive.

In accordance with an aspect of the present invention, there is provided a disk drive comprising a housing; a disk rotatably mounted in the housing; a head for reading/writing data on the disk; an actuator arm rotatably mounted in the housing; a suspension having a base end portion fixed to a front end portion of the actuator arm and a front end portion for supporting the head, the suspension having a first conductor pattern connected at one end thereof to the head and a first terminal connected to another end of the first conductor; a main flexible printed circuit sheet fixed at one end portion thereof to the actuator arm, the main flexible printed circuit sheet having a second conductor pattern and a second terminal connected to one end of the second pattern; and an interconnection flexible printed circuit sheet mounted along a side surface of the actuator arm so as to extend substantially parallel to an upper surface of the actuator arm, the interconnection flexible printed circuit sheet having a third conductor pattern, a third terminal connected to one end of the third conductor pattern and the first terminal, and a fourth terminal connected to another end of the third conductor pattern and the second terminal.

Preferably, the side surface of the actuator arm has a projecting portion having a groove extending substantially parallel to the upper surface of the actuator arm, and the interconnection flexible printed circuit sheet is inserted in the groove of the projecting portion.

In accordance with another aspect of the present invention, there is provided a disk drive comprising a housing; a disk rotatably mounted in the housing; a head for reading/writing data on the disk; an actuator arm rotatably mounted in the housing; a suspension having a base end portion fixed to a front end portion of the actuator arm and a front end portion for supporting the head, the suspension having a first conductor pattern connected at one end thereof to the head and a first terminal connected to another end of the first conductor; and a flexible printed circuit sheet fixed at an intermediate portion thereof to the actuator arm, the flexible printed circuit sheet having a second conductor pattern and a second terminal connected to one end of the second conductor pattern and the first terminal; the flexible printed circuit sheet having a connecting portion formed between the intermediate portion and the suspension and mounted along a side surface of the actuator arm so as to extend substantially parallel to an upper surface of the actuator arm.

Since the interconnection flexible printed circuit sheet is mounted along the side surface of the actuator arm so as to extend substantially parallel to the upper surface of the actuator arm, the width of the interconnection flexible printed circuit sheet is not limited by the thickness of the actuator arm. Accordingly, an interconnection flexible printed circuit sheet having a relatively large width can be used, so that a required number of signal lines can be easily ensured and the pattern width of each signal line can be made [enough large] *large enough*.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
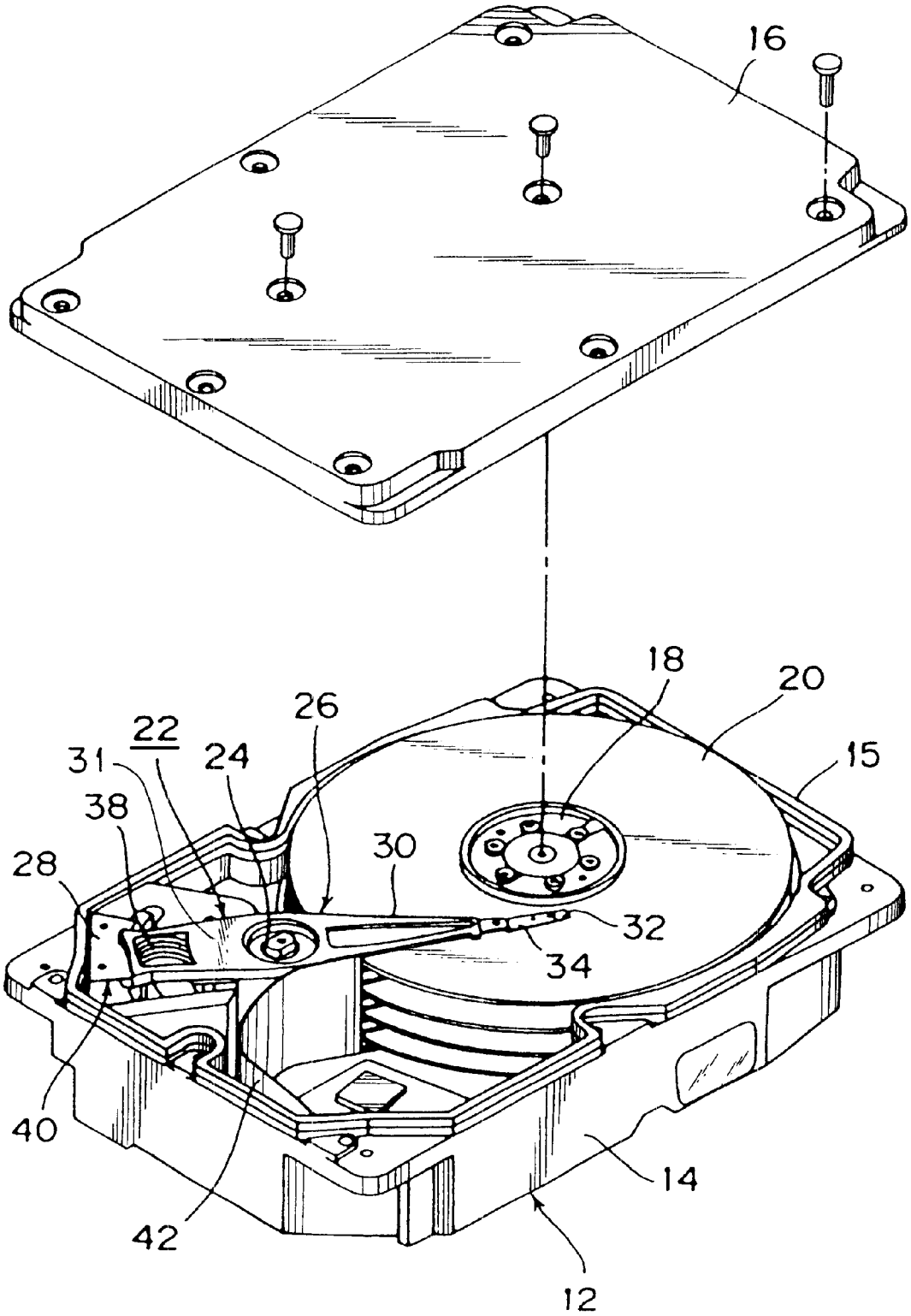
FIG. 1 is a perspective view of a magnetic disk drive according to the present invention.

Referring to FIG. 1, there is shown a perspective view of a magnetic disk drive including a connection structure according to the present invention. Reference numeral 12 denotes a housing (disk enclosure) composed of a base 14 and a cover 16. A spindle hub (not shown) to be rotatably driven by an inner hub motor (not shown) is provided on the base 14. A plurality of magnetic disks 20 and spacers (not shown) are alternately stacked and mounted on the spindle hub. That is, the plurality of magnetic disks 20 are regularly spaced from each other by the spacers and are fixedly mounted on the spindle hub by securing a disk clamp 18 to the spindle hub by screws.

Reference numeral 22 denotes a rotary head actuator composed of an actuator arm assembly 26 and a magnetic circuit 28. The actuator arm assembly 26 is rotatably mounted about a shaft 24 fixed to the base 14. The actuator arm assembly 26 includes a plurality of actuator arms 30 extending from the center of rotation of the assembly 26 in one direction and a coil supporting portion 31 extending from the center of rotation of the assembly 26 in another direction opposite to the direction of extension of the actuator arms 30. A coil 38 is mounted on the coil supporting portion 31. The magnetic circuit 28 and the coil 38 constitute a voice coil motor 40. A plurality of suspensions 34 are fixed at their base or read end portions to the front end portions of the actuator arms 30, and a plurality of magnetic heads 32 are supported on the front end portions of the suspensions 34.

Reference number 42 denotes a main FPC for supplying a write signal to each magnetic head 32 and *for* taking out a read signal from each magnetic head 32 to external equipment. The main FPC 42 is fixed at its one end portion to the actuator arms 30, and the other end portion of the main FPC 42 is connected to a connector (not shown) for exchanging signals between the disk drive and the external equipment. An annular packing assembly 15 is mounted on the base 14, and the cover 16 is secured by screws to the base 14 with the packing assembly 15 interposed therebetween, thereby sealing the housing 12.

Figure 2:
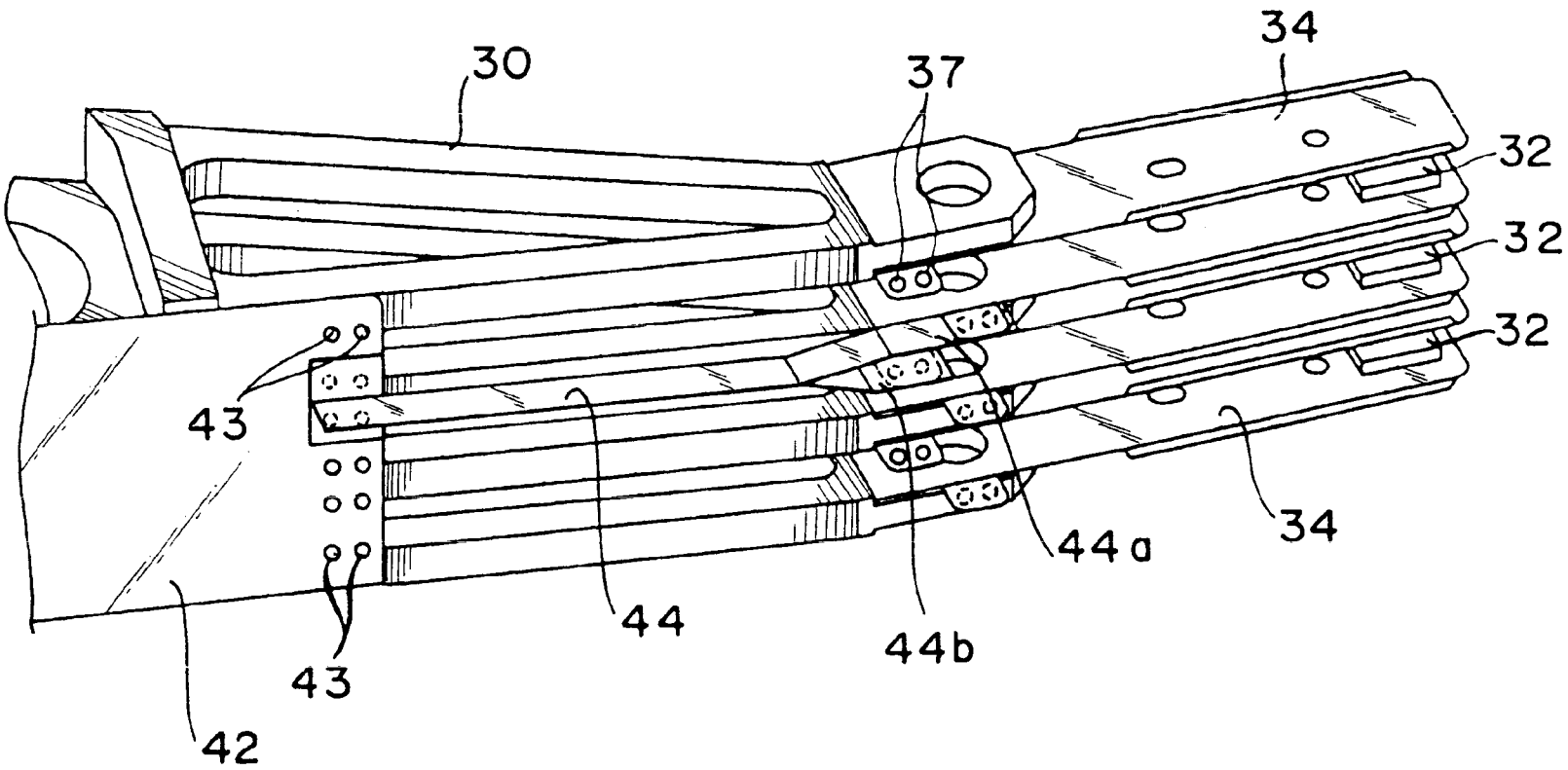
FIG. 2 is a perspective view of a first preferred embodiment of the present invention.
Figure 3:
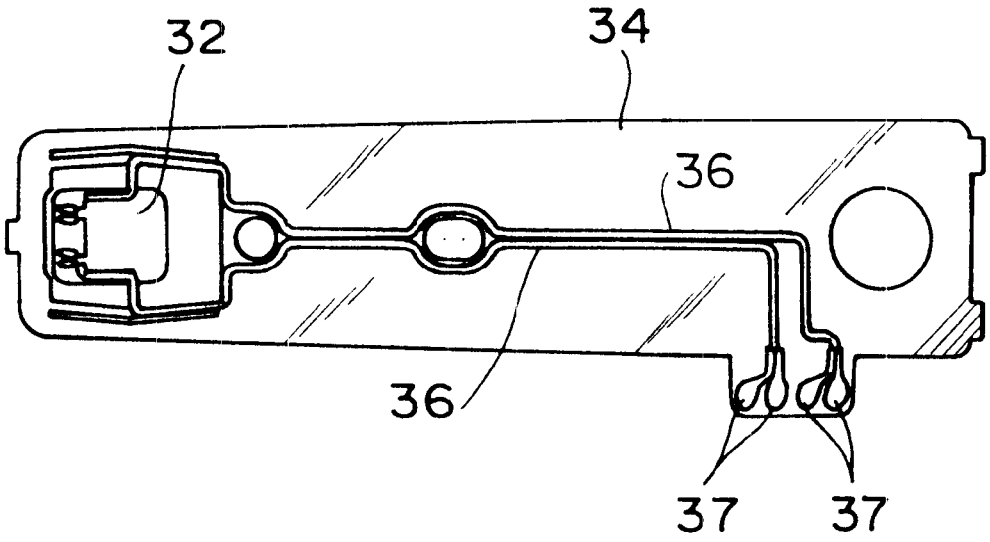
FIG. 3 is a plan view of a suspension in the case of using an MR head.

Referring to FIG. 2, there is shown a perspective view of a first preferred embodiment of the present invention. The main FPC 42 is bonded at its one end portion to the side surfaces of the actuator arms 30 on one side thereof. The one end portion of the main FPC 42 is formed with a plurality of terminals 43 connected to a plurality of conductor patterns (not shown) formed in the main FPC 42. Referring to FIG. 3, a plurality of conductor patterns 36 are formed on each suspension 34. First ends of the conductor patterns 36 are connected to each magnetic head 32 such as an MR head, and second ends of the conductor patterns 36 are connected to a plurality of terminals 37 formed on each suspension 34. Conductor patterns 36 may be formed by photolithography as shown in FIG. 3. Lead wires can be used in place of conductor patterns.

In the case where an MR head is used as each magnetic head 32, the conductor patterns 36 on each suspension 34 include four signal lines. Accordingly, the number of the plural terminals 37 on each suspension 34 is set to four as shown in FIG. 3. In contrast, in the case where an ordinary inductive head is used as each magnetic head 32, the conductor patterns 36 on each suspension 36 include two signal lines. Accordingly, the number of the plural terminals 37 on each suspension 34 is set to two. For example, each suspension 34 is formed from stainless steel, and is fabricated by coating polyimide on a sheet of stainless steel, forming the conductor patterns 36 of copper on the polyimide coating, and then coating polyimide again over the sheet to cover the conductor patterns 36.

Figure 4:
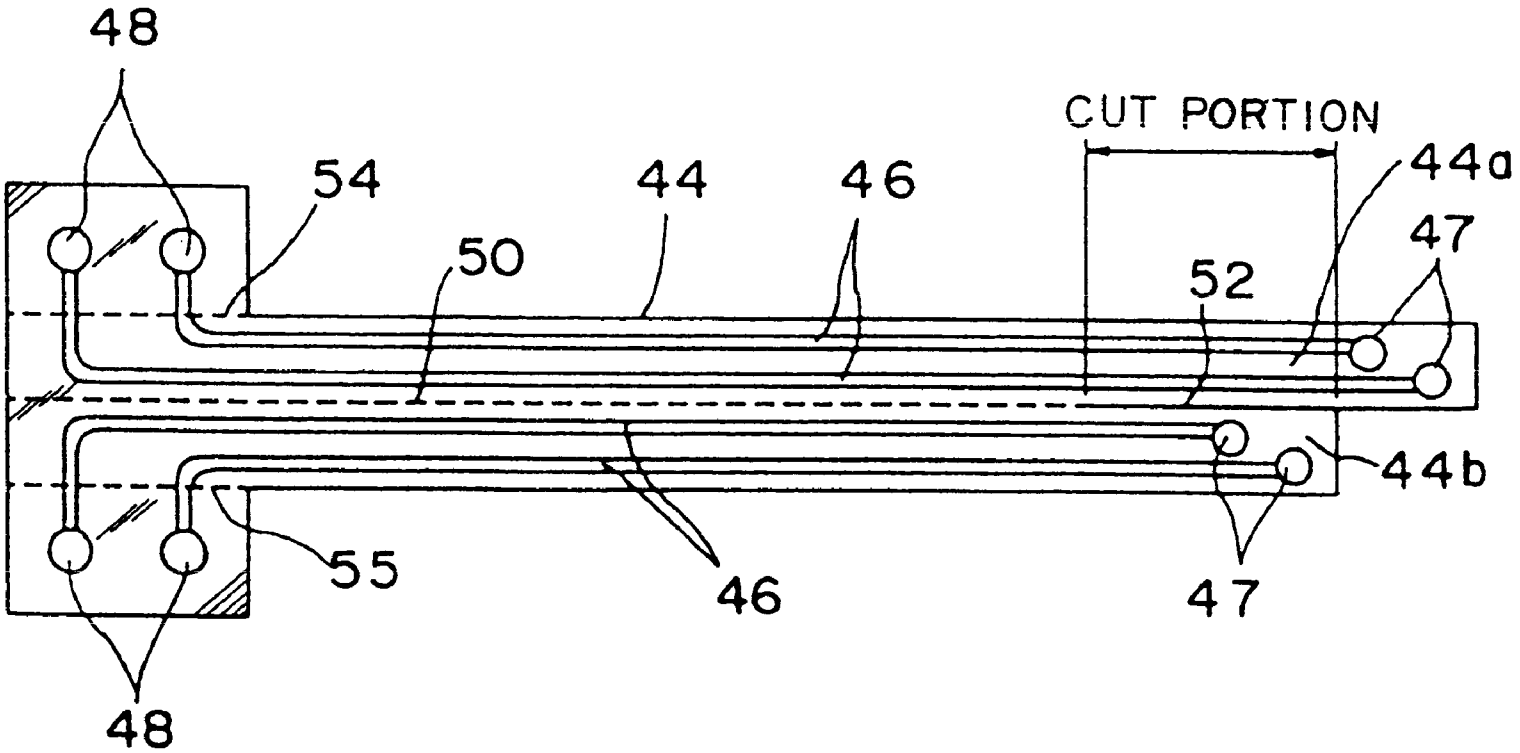
FIG. 4 is a developed plan view of an interconnection FPC in the first preferred embodiment.

Referring again to FIG. 2, the terminals 37 of each suspension 34 are connected through an interconnection FPC 44 to the corresponding terminals 43 of the main FPC 42. The interconnection FPC 44 is mounted along the side surface of each actuator arm 30 so as to extend substantially parallel to the upper surface of each actuator arm 30. The interconnection FPC 44 has a configuration shown in FIG. 4. That is, the interconnection FPC 44 has a plurality of conductor patterns 46, and each conductor pattern 46 is connected at its both ends to terminals 47 and 48.

The interconnection FPC 44 has a shape such that it is folded along a longitudinally extending broken line 50 as a substantially longitudinal center line so as to form a ridge line, and is cut along a solid line 52 longitudinally extending from the broken line 50 to form an FPC 44a for the upward facing head 32 and an FPC 44b for the downward facing head 32. The interconnection FPC 44 is further folded along broken lines 54 and 55 so as to form trough lines. The terminals 47 of each interconnection FPC 44 are soldered to the terminals 37 of the corresponding two adjacent suspensions 34 for supporting the upward and downward facing heads 32, and the terminals 48 of each interconnection FPC 44 are soldered to the corresponding terminals 43 of the main FPC 42.

Figure 5:
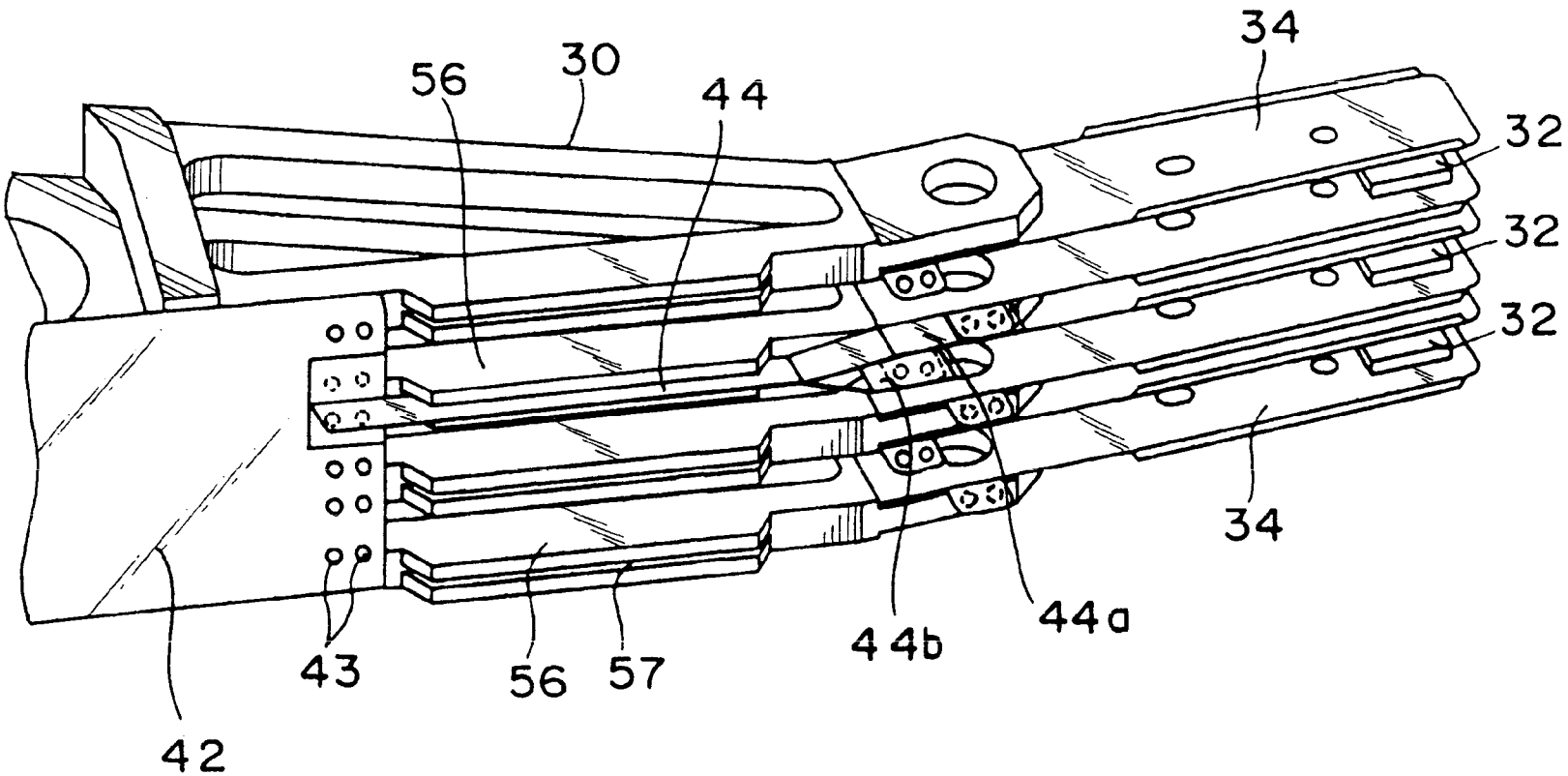
FIG. 5 is a perspective view of a second preferred embodiment of the present invention.

Referring to FIG. 5, there is shown a perspective view of a second preferred embodiment of the present invention. In the following description of the second preferred embodiment and other preferred embodiments, the same reference numerals will denote substantially the same parts, and the detailed description thereof will be omitted. In the first preferred embodiment shown in FIG. 2, the interconnection FPC 44 is somewhat unstable because it is merely mounted along the side surface of each actuator arm 30. To ensure the stability of the interconnection FPC 44, the second preferred embodiment has a structure that the side surface of each actuator arm 30 is integrally formed with a projecting portion 56 having a groove 57 extending substantially parallel to the upper surface of each actuator arm 30, and that the interconnection FPC 44 is inserted at its intermediate portion in the groove 57. Thus, the intermediate portion of the interconnection FPC 44 is supported within the groove 57 of the projecting portion 56 of each actuator arm 30, thereby stabilizing the interconnection FPC 44. Further, the intermediate portion of the interconnection FPC 44 may be fixed in the groove 57 by using an adhesive, thereby increasing the stability of the interconnection FPC 44.

Figure 6:
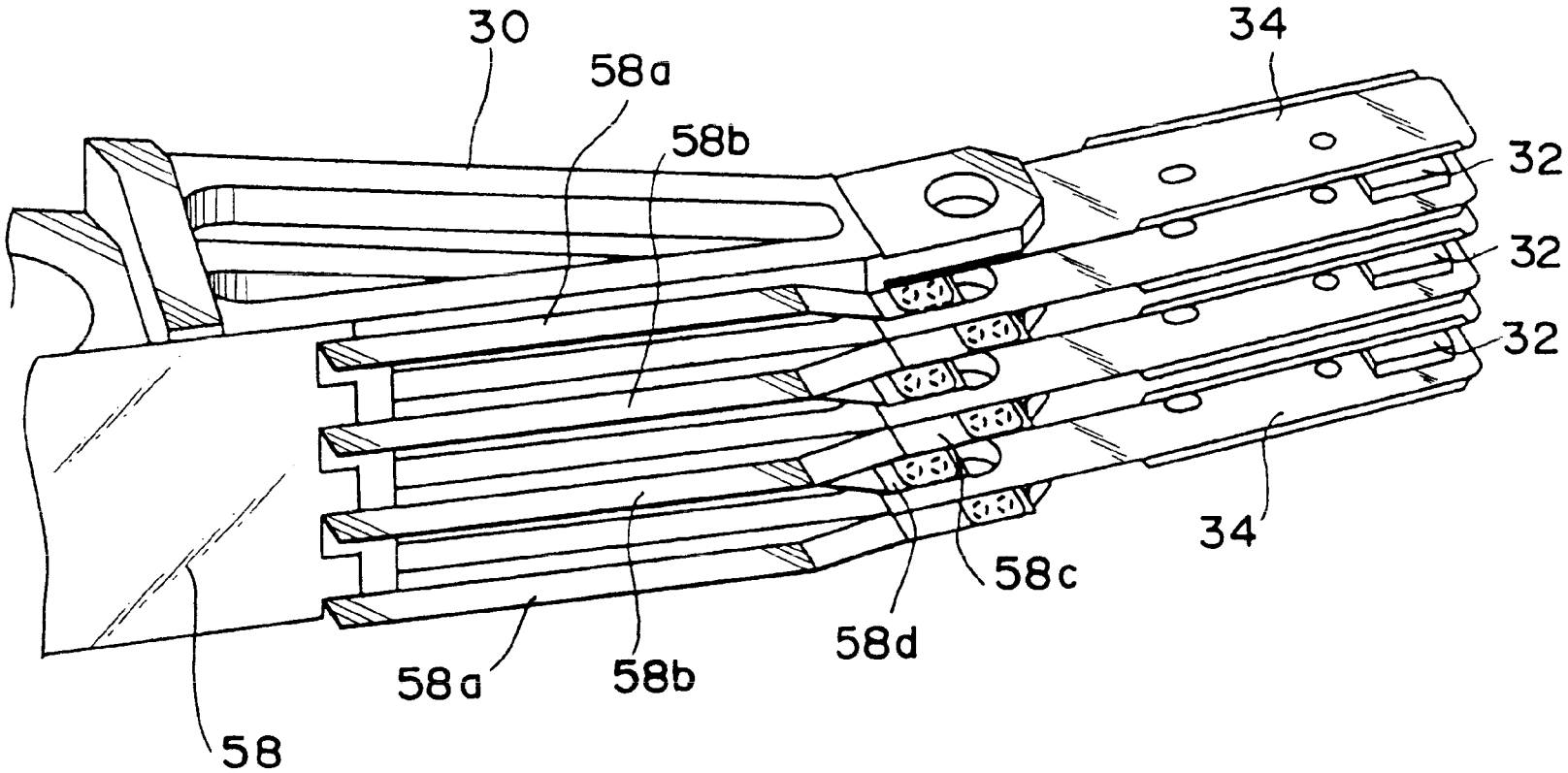
FIG. 6 is a perspective view of a third preferred embodiment of the present invention.

Referring to FIG. 6, there is shown a perspective view of a third preferred embodiment of the present invention. This preferred embodiment employs an integrated FPC 58 formed as by integrating the main FPC 42 and the interconnection FPCs 44 used in the first or second preferred embodiment. That is, an intermediate portion of the integrated FPC 58 is fixed to the side surfaces of the actuator arms 30 on one side thereof, and a front end portion of the integrated FPC 58 on the suspensions 34 side is cut and bent to form a plurality of connecting portions 58a and 58b extending substantially parallel to the upper surfaces of the actuator arms 30.

Terminals formed at the front end of each connecting portion 58a are connected to the terminals 37 of the corresponding suspension 34. On the other hand, each connecting portion 58b has a shape such that it is folded in its longitudinal direction like the interconnection FPC 44 shown in FIG. 4 and is cut at its front end portion to form an FPC 58c for the upward facing head 32 and an FPC 58d for the downward facing head 32. Terminals formed at the front end of the FPC 58c and terminals formed at the front end of the FPC 58d are connected to the terminals 37 of the corresponding two adjacent suspensions 34 for supporting the upward and downward facing heads 32.

Figure 7:
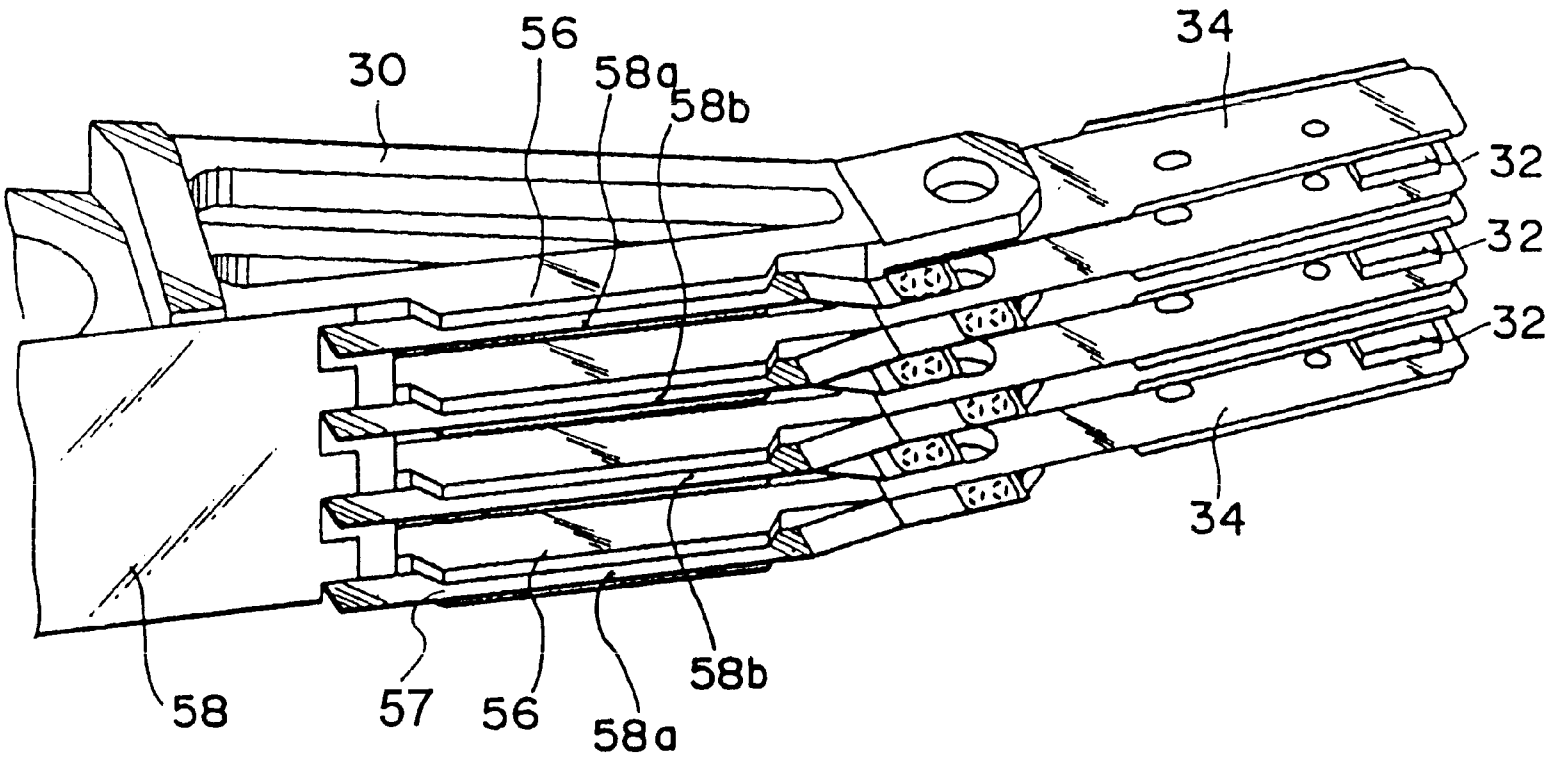
FIG. 7 is a perspective view of a fourth preferred embodiment of the present invention.

As similar to the first preferred embodiment, the connecting portions 58a and 58b of the integrated FPC 58 are somewhat unstable. Accordingly, it is preferable to employ the structure as shown in FIG. 7 showing a fourth preferred embodiment of the present invention. In this preferred embodiment, each of the connecting portions 58a and 58b is inserted at their respective intermediate portions in the groove 57 of the projecting portion 56 of each actuator arm 30. Accordingly, the intermediate portion of each of the connecting portions 58a and 58b of the integrated FPC 58 is stably supported within the corresponding groove 57. As required, the intermediate portion of each of the connecting portions 58a and 58b may be fixed by bonding in the corresponding groove 57.

Figure 8:
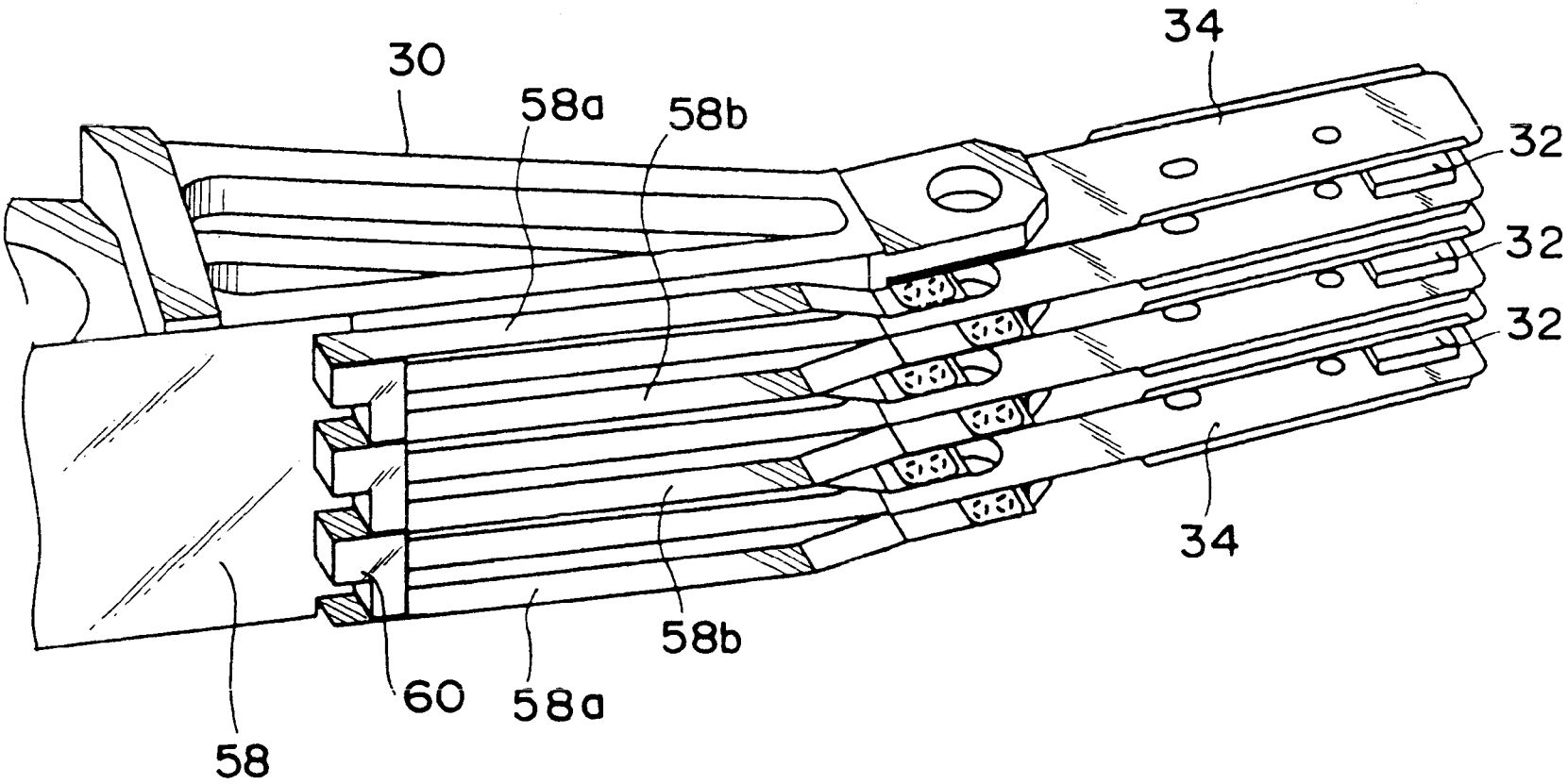
FIG. 8 is a perspective view of a fifth preferred embodiment of the present invention.
Figure 9:
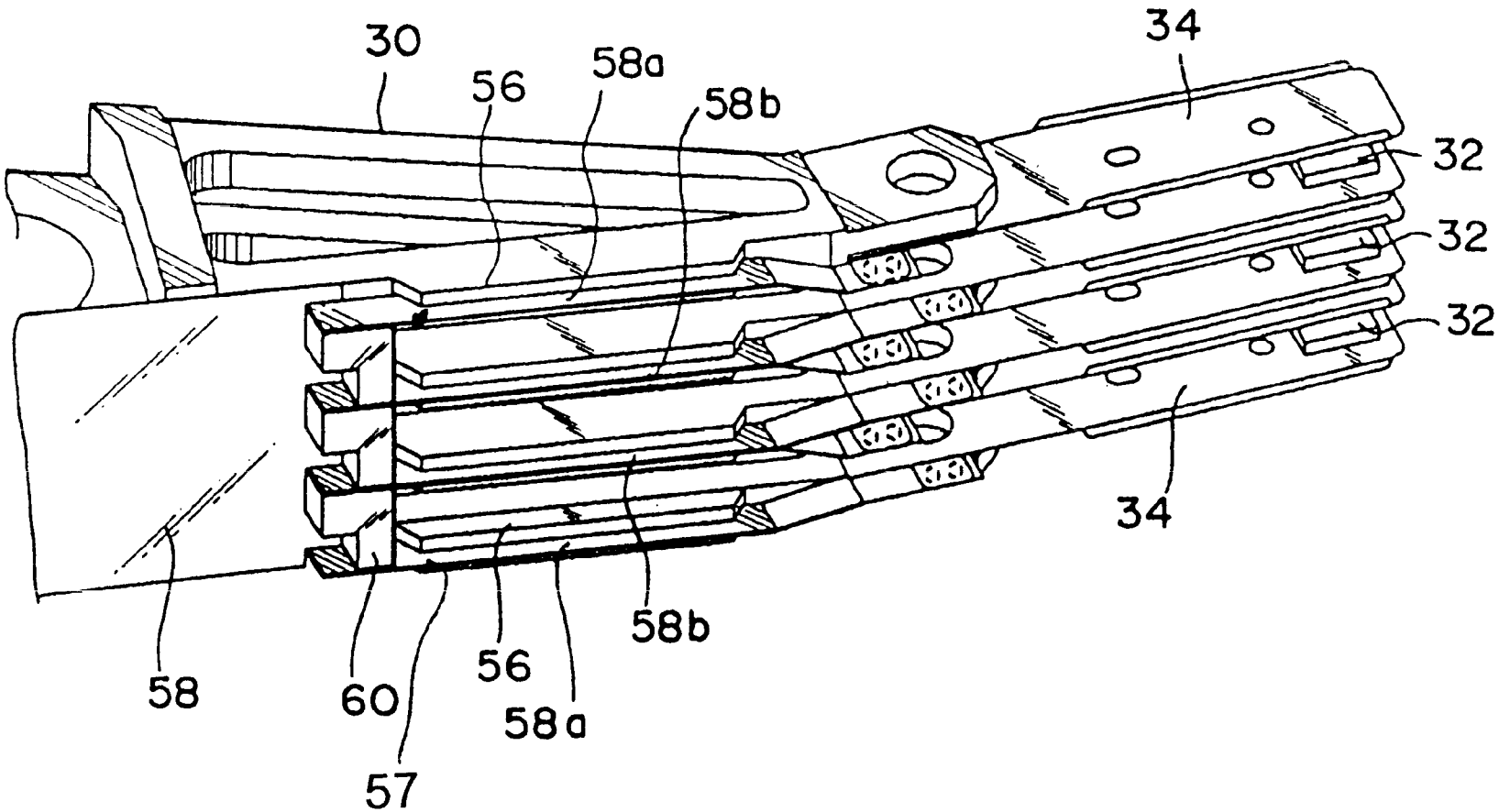
FIG. 9 is a perspective view of a sixth preferred embodiment of the present invention.

Referring to FIG. 8, there is shown a perspective view of a fifth preferred embodiment of the present invention. In this preferred embodiment, a plurality of guide blocks 60 formed from a resin are bonded to the side surfaces of the actuator arms 30 to thereby support the connecting portions 58a and 58b of the integrated FPC 58 at their base or rear end portions. Preferably, the rear end portions of the connecting portions 58a and 58b are bonded to the upper surfaces of the guide blocks 60, thereby stabilizing the connecting portions 58a and 58b of the integrated FPC 58. To further stabilize the connecting portions 58a and 58b, the structure shown in FIG. 9 showing a sixth preferred embodiment of the present invention may be employed. That is, each of the connecting portions 58a and 58b is inserted at their respective intermediate portions in the groove 57 of the projecting portion 56 of each actuator arm 30.

According to the present invention as described above, the signal can be supplied to and taken out of each head with high reliability in response to size reduction and thickness reduction of the magnetic disk drive.

What is claimed is:

1. A disk drive comprising:

a housing;

a disk rotatably mounted in said housing;

a head for reading/writing data on said disk;

an actuator arm rotatably mounted in said housing;

a suspension having a base end portion fixed to a front end portion of said actuator arm and a front end portion for supporting said head, said suspension having a first conductor pattern connected at one end thereof to said head and a first terminal connected to another end of said first conductor pattern;

a main flexible printed circuit sheet fixed at one end portion thereof to said actuator arm, said main flexible printed circuit sheet having a second terminal; and an interconnection flexible printed circuit sheet mounted along a side surface of said actuator arm so as to extend substantially parallel to an upper surface of said actuator arm, said interconnection flexible printed circuit sheet having a second conductor pattern, a third terminal connected to one end of said second conductor pattern and said first terminal, and a fourth terminal connected to another end of said second conductor pattern and said second terminal.

2. A disk drive according to claim 1, wherein said side surface of said actuator arm has a projecting portion having a groove extending substantially parallel to said upper surface of said actuator arm, and said interconnection flexible printed circuit sheet is inserted in said groove of said projecting portion.

3. A disk drive according to claim 2, wherein said interconnection flexible printed circuit sheet is fixed by bonding in said groove of said projecting portion.

4. A disk drive according to claim 2, wherein said suspension comprises a pair of suspensions fixed to upper and lower surfaces of said front end portion of said actuator arm, and said interconnection flexible printed circuit sheet comprises first and second segments folded along a substantially longitudinal center line of said interconnection flexible printed circuit sheet, each of said first and second segments having said third conductor pattern, said third terminal, and said fourth terminal.

5. A disk drive comprising;

a housing;

a disk rotatably mounted in said housing;

a head for reading/writing data on said disk;

an actuator arm rotatably mounted in said housing;

a suspension having a base end portion fixed to a front end portion of said actuator arm and a front end portion for supporting said head, said suspension having a first conductor pattern connected at one end thereof to said head and a first terminal connected to another end of said first conductor; and a flexible printed circuit sheet fixed at an intermediate portion thereof to said actuator arm, said flexible printed circuit sheet having a second terminal connected to said first terminal;

said flexible printed circuit sheet having a connecting portion formed between said intermediate portion and said suspension and mounted along a side surface of said actuator arm so as to extend substantially parallel to an upper surface of said actuator arm.

6. A disk drive according to claim 5, wherein said side surface of said actuator arm has a projecting portion having a groove extending substantially parallel to said upper surface of said actuator arm, and said connecting portion is inserted in said groove of said projecting portion.

7. A disk drive according to claim 6, wherein said connecting portion of said flexible printed circuit sheet is fixed by bonding in said groove of said projecting portion.

8. A disk drive according to claim 5, wherein said side surface of said flexible printed circuit sheet has a guide for supporting said connecting portion of said flexible printed circuit sheet.

9. A disk drive according to claim 5 wherein said first conductor pattern includes four lines connected to said head.

10. A disk drive comprising:

a housing;

a disk rotatably mounted in said housing;

a head for reading/writing data on said disk;

an actuator arm rotatably mounted in said housing, said actuator arm supporting said head;

a main flexible printed circuit sheet fixed at one end portion thereof to said actuator arm, said main flexible printed circuit sheet having a first terminal; and an interconnection flexible printed circuit sheet mounted along a side surface of said actuator arm so as to extend substantially parallel to an upper surface of said actuator arm, said interconnection flexible printed circuit sheet having a conductor pattern, a second terminal connected to one end of said conductor pattern and said head, and a third terminal connected to another end of said conductor pattern and said first terminal.

11. A disk drive according to claim 10, wherein said side surface of said actuator arm has a projecting portion having a groove extending substantially parallel to said upper surface of said actuator arm, and said interconnection flexible printed circuit sheet is inserted in said groove of said projecting portion.

12. A disk drive according to claim 11, wherein said interconnection flexible printed circuit sheet is fixed by bonding in said groove of said projecting portion.

13. A disk drive according to claim 10 wherein said first conductor pattern includes four lines connected to said head.

*14. A disk drive comprising:*

*a housing;*

*a head for reading/writing data on a disk;*

*an actuator arm rotatably mounted within said housing, said actuator arm defining a longitudinal plane extending in a direction generally perpendicular to an axis of rotation of said actuator arm and having a side surface extending in a direction generally perpendicular to said longitudinal plane, said actuator arm further defining an upper surface and a lower surface;*

*a suspension attached to a distal end of said actuator arm, said suspension having a main longitudinal surface extending between a first longitudinal end portion and a second longitudinal end portion, wherein said second longitudinal end portion is adapted to support said head, said suspension including a base layer, an insulating layer and a plurality of conductors for transferring current to and from said head; and*

*a printed circuit sheet having a main surface of a width sufficient to accommodate said plurality of conductors, said printed circuit sheet being mounted along said side surface of said actuator arm, between said upper and lower surfaces of said actuator arm, and wherein said main surface of said printed circuit sheet is generally parallel to said longitudinal plane of said actuator arm*

*wherein said side surface of said actuator arm has a groove extending generally parallel to said longitudinal plane of said actuator arm, and further wherein said printed circuit sheet is inserted into said groove.*

*15. A disk drive according to claim 14, wherein said printed circuit sheet is flexible.*

*16. A disk drive according to claim 14, wherein said actuator arm has at least one projection on said side surface, said at least one projection having a supporting surface extending generally parallel to said longitudinal plane of said actuator arm, and further wherein said printed circuit sheet is supported by said supporting surface.*

*17. A disk drive according to claim 14, wherein said suspension is a separate component from said printed circuit sheet.*

*18. A disk drive according to claim 14, wherein said printed circuit sheet is fixed within said groove by bonding.*

*19. A disk drive according to claim 14, wherein said printed circuit sheet comprises:*

*a branch portion mounted on said side surface of said actuator arm; and*

*a main portion connected to one end of said branch portion at one end thereof and connected to said disk drive to another end thereof.*

*20. A disk drive according to claim 19, wherein said branch portion and said main portion of said printed circuit sheet are integrally formed as a single sheet.*

*21. A disk drive according to claim 19, wherein said branch portion and said main portion of said printed circuit sheet are formed as separate sheets.*

*22. A disk drive according to claim 14, wherein a guide block is mounted on said side surface of said actuator arm, said guide block having a supporting surface extending generally parallel to said longitudinal plane of said actuator arm, said supporting surface supporting said printed circuit sheet.*

*23. A disk drive according to claim 14, wherein said insulating layer of said suspension is formed upon said base layer of said suspension.*

*24. A disk drive according to claim 23 wherein at least a portion of said plurality of conductors is formed upon said insulating layer of said suspension.*

*25. A disk drive comprising:*

*a housing;*

*a head for reading/writing data on a disk;*

*an actuator arm rotatably mounted within said housing, said actuator arm defining a longitudinal plane extending in a direction generally perpendicular to an axis of rotation of said actuator arm and having a side surface extending in a direction generally perpendicular to said longitudinal plane, said actuator arm further defining an upper surface and a lower surface;*

*a suspension attached to a distal end of said actuator arm, said suspension having a main longitudinal surface extending between a first longitudinal end portion and a second longitudinal end portion, wherein said second longitudinal end portion is adapted to support said head, said suspension including a base layer, an insulating layer and a plurality of conductors for transferring current to and from said head; and*

*a printed circuit sheet having a main surface of a width sufficient to accommodate said plurality of conductors, said printed circuit sheet being mounted along said side surface of said actuator arm, between said upper and lower surfaces of said actuator arm, and wherein said main surface of said printed circuit sheet is generally parallel to said longitudinal plane of said actuator arm;*

*wherein said printed circuit sheet terminates near said distal end of said actuator arm.*

*26. A disk drive according to claim 25, wherein said plurality of conductors includes a plurality of signal lines located upon said printed circuit sheet and conductor patterns located upon said suspension.*

*27. A disk drive according to claim 26, wherein said conductor patterns of said suspension are connected to said signal lines of said printed circuit sheet by a plurality of cooperating terminals.*

*28. A disk drive comprising;*

*a housing;*

*a head for reading/writing data on a disk;*

*an actuator arm extending between a proximal end and a distal end and being movably mounted, at said proximal end, within said housing for moving along a surface of said disk, said actuator arm defining a longitudinal plane extending in a direction generally parallel to said surface of said disk and having a side surface extending in a direction generally perpendicular to said longitudinal plane; and*

*a printed circuit sheet having a main surface of a width sufficient to accommodate a plurality of signal lines, said printed circuit sheet being mounted along said side surface of said actuator arm, between upper and lower surfaces of said actuator arm, and wherein said main surface of said printed circuit sheet is generally parallel to said longitudinal plane of said actuator arm and further wherein said printed circuit sheet terminates near said distal end of said actuator arm.*

*29. A disk drive according to claim 28, further comprising a suspension connected to said distal end of said actuator arm.*

*30. A disk drive according to claim 29, wherein said suspension includes conductor patterns that are electrically connected to said signal lines of said printed circuit sheet.*

*31. A disk drive according to claim 30, wherein said conductor patterns of said suspension terminate near an area where said suspension is connected to said actuator arm.*

*32. A disk drive according to claim 31, wherein said conductor patterns of said suspension are connected to said signal lines of said printed circuit sheet by a plurality of cooperating terminals.*

*33. A disk drive according to claim 29 wherein said suspension includes a base layer, an insulating layer formed upon said base layer, and conductor patterns formed upon said insulating layer, wherein said conductor patterns are electrically connected to said signal lines of said printed circuit sheet.*

*34. A disk drive according to claim 29, wherein said suspension is a separate component from said printed circuit sheet.*

*35. A disk drive comprising:*

*a housing;*

*a head for reading/writing data on a disk;*

*an actuator arm rotatably mounted within said housing, said actuator arm defining a longitudinal plane extending in a direction generally perpendicular to an axis of rotation of said actuator arm and having a side surface extending in a direction generally perpendicular to said longitudinal plane, said actuator arm further defining an upper surface and a lower surface;*

*a printed circuit sheet for electrical connection to said head, said printed circuit sheet having a main surface of a width sufficient to accommodate a plurality of signal lines; and*

*at least one upper projecting portion and at least one lower projecting portion extending from said side surface of said actuator arm, wherein said printed circuit sheet is mounted along said side surface of said actuator arm between said at least one upper projecting portion and said at least one lower projecting portion such that said main surface of said printed circuit sheet is generally parallel to said longitudinal plane of said actuator arm.*

*36. A disk drive according to claim 35, wherein said at least one upper projecting portion is positioned directly above said at least one lower projecting portion.*

*37. A disk drive according to claim 36, wherein said at least one upper projecting portion and said at least one lower projecting portion are integrally formed as parts of said actuator arm, and further wherein an upper surface of said at least one upper projecting portion is coplanar with said upper surface of said actuator arm and a lower surface of said at least one lower projecting portion is coplanar with said lower surface of said actuator arm.*

*38. A disk drive according to claim 35, wherein said at least one upper projecting portion and said at least one lower projecting portion are integrally formed as parts of said actuator arm, and further wherein an upper surface of said at least one upper projecting portion is coplanar with said upper surface of said actuator arm and a lower surface of said at least one lower projecting portion is coplanar with said lower surface of said actuator arm.*

* * * * *